Figure 10:
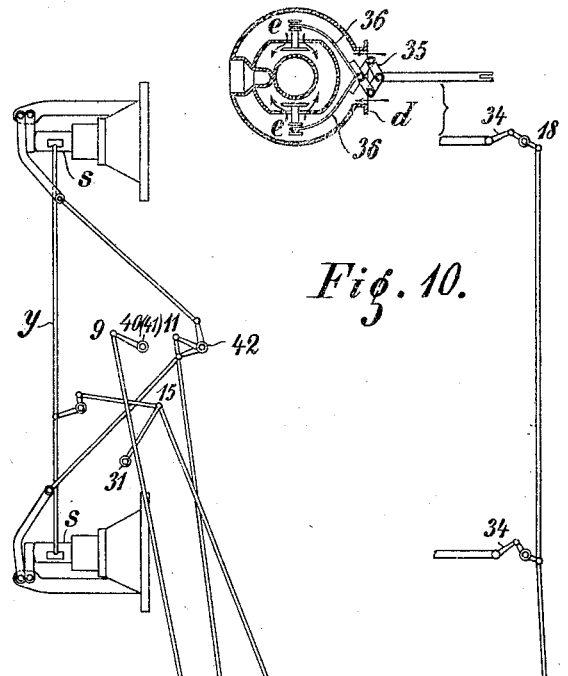

W. GRINEWEZKI.
COMBUSTION MOTOR WITH RECIPROCATING PISTON.
APPLICATION FILED JAN. 28, 1907.
1,006,476.
Patented Oct. 24, 1911.
9 SHEETS—SHEET 1.
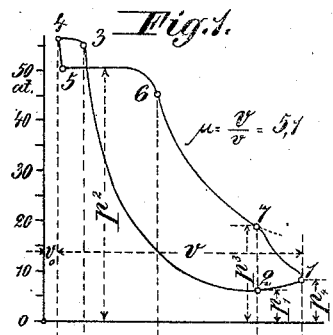
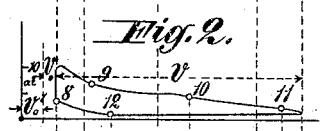
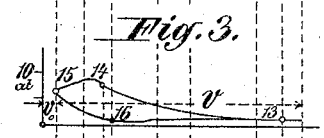
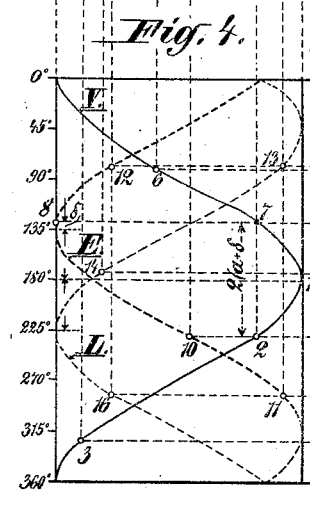
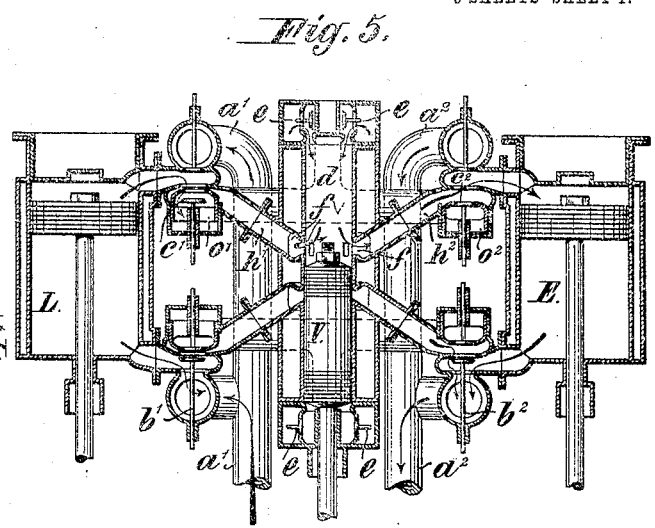
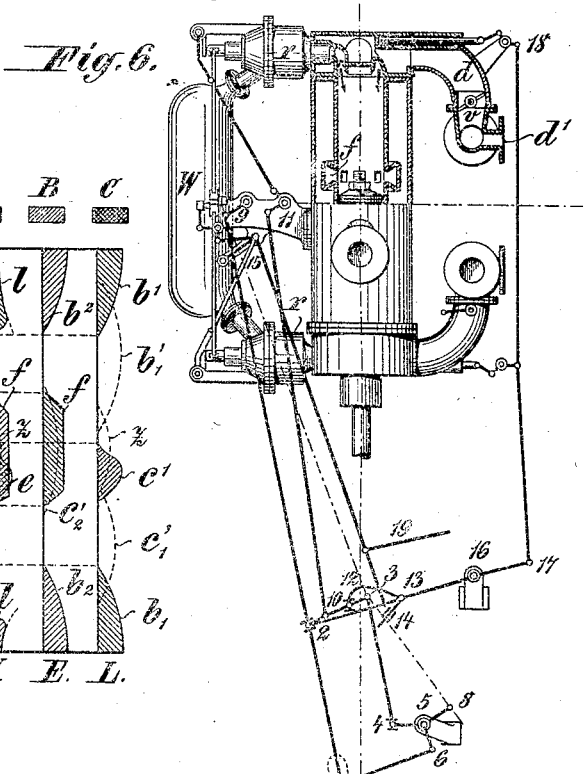

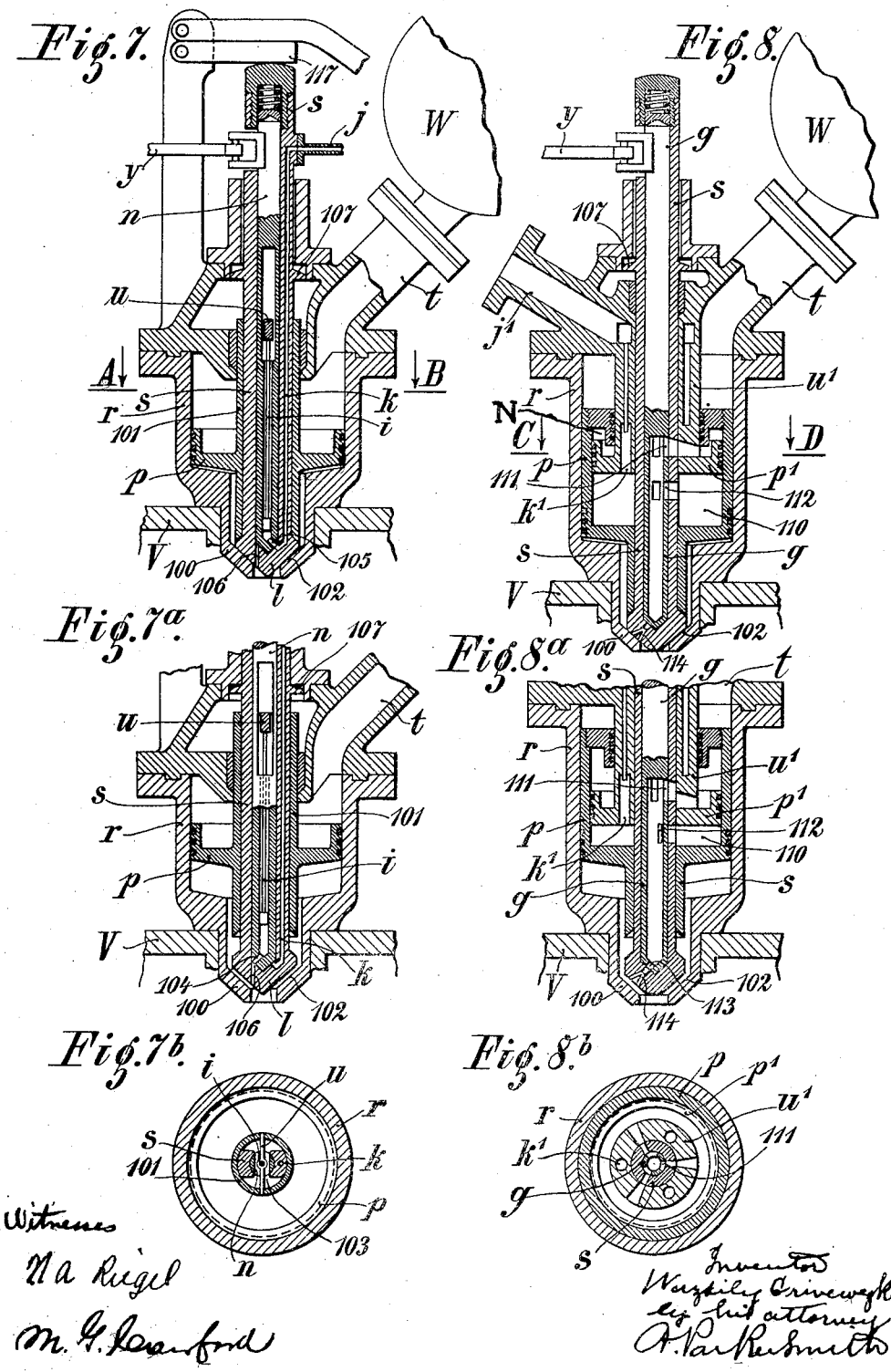

W. GRINEWEZKI.
COMBUSTION MOTOR WITH RECIPROCATING PISTON.
APPLICATION FILED JAN. 28, 1907.

1,006,476.

Patented Oct. 24, 1911.

9 SHEETS—SHEET 3.

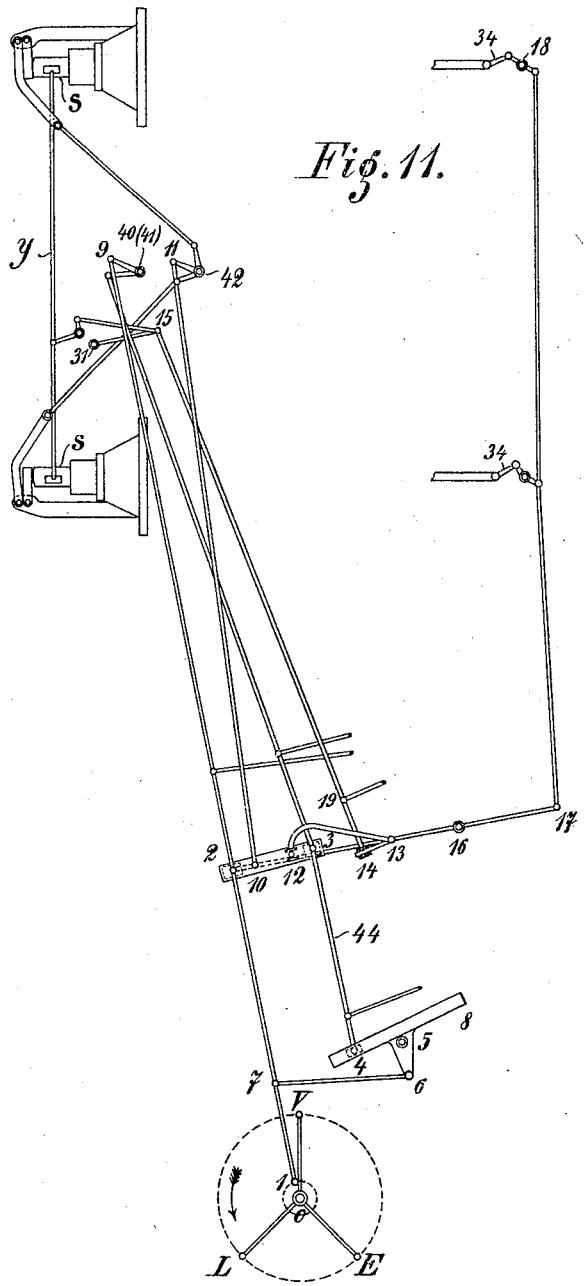

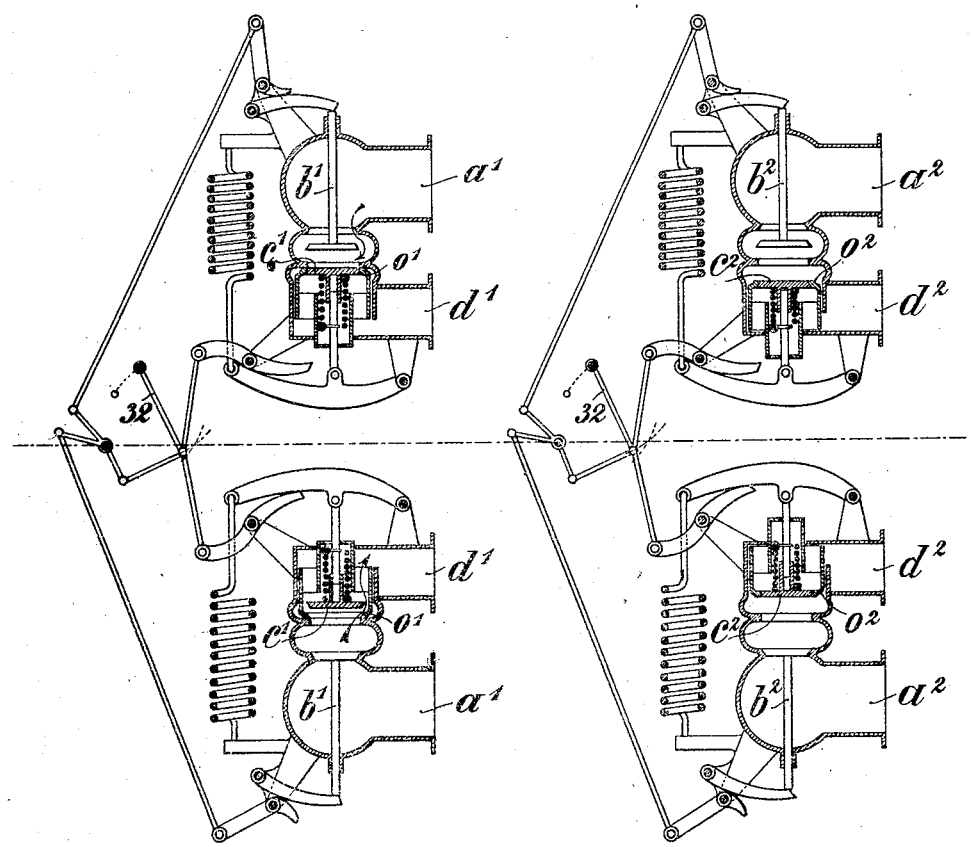

W. GRINEWEZKI.
COMBUSTION MOTOR WITH RECIPROCATING PISTON.
APPLICATION FILED JAN. 28, 1907.

1,006,476.

Patented Oct. 24, 1911.

9 SHEETS—SHEET 9.

UNITED STATES PATENT OFFICE.

WASSILY GRINEWEZKI, OF MOSCOW, RUSSIA.

COMBUSTION-MOTOR WITH RECIPROCATING PISTON.

1,006,476.

Specification of Letters Patent.   Patented Oct. 24, 1911.

Application filed January 28, 1907. Serial No. 354,575.

*To all whom it may concern:*

Be it known that I, WASSILY GRINEWEZKI, of Moscow, a subject of the Emperor of Russia, and whose post-office address is No. 26 Gorochowsky street, Moscow, Russian Empire, have invented a new and useful Combustion-Motor with Reciprocating Piston, of which the following is a specification.

The invention relates to a combustion motor with reciprocating piston for liquid and gaseous combustibles.

The drawing shows the motor with the assistance of indicator diagrams and some preferable embodiments which are diagrammatically represented.

The motor is an internal combustion motor of the class in which the gases of combustion are expanded in separate cylinders, *i. e.* it is a compound oil or gas engine, and it also has a pump or air cylinder which forces a fresh charge of air into, and, in part through, the combustion cylinder into the second or expansion cylinder, at each stroke. This cools and scavenges the combustion cylinder and also causes the motor to operate in part as a hot air engine, the scavenging air which absorbs heat from the combustion cylinder and the burned gases therein expanding in the expansion cylinder, together with said burned gases, and doing useful work there.

Among the novel features of my invention are an arrangement of cylinders and valves by which it can be reversed in its direction of rotation, the air cylinder becoming the expansion cylinder when the engine runs in the opposite direction and the expansion cylinder becoming an air cylinder, and also a governing carbureter by which the clearance spaces of the combustion cylinder proper are reduced to the minimum and an even pressure maintained during a large portion of the combustion stroke, whereby great efficiency and fuel economy are secured.

Figure 9:
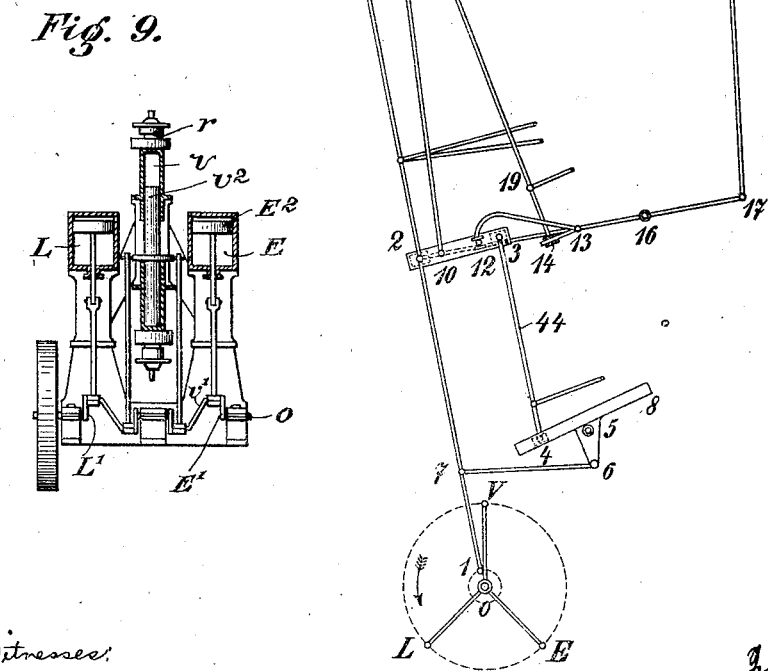
Figure 14:
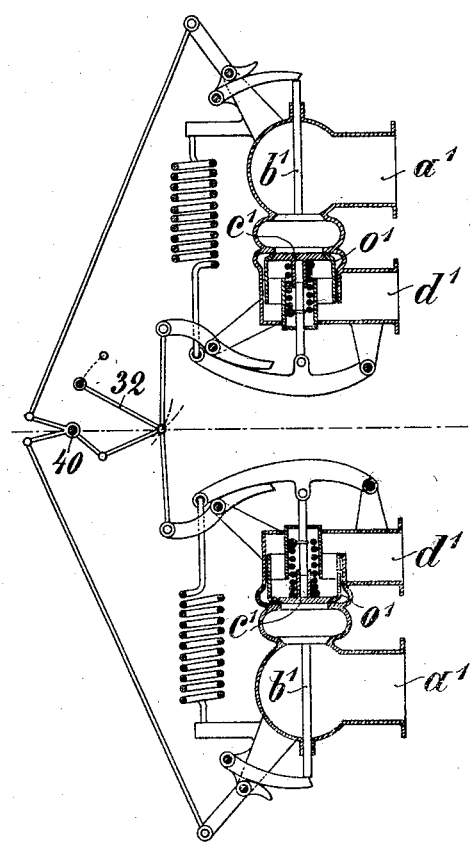
Figure 15:
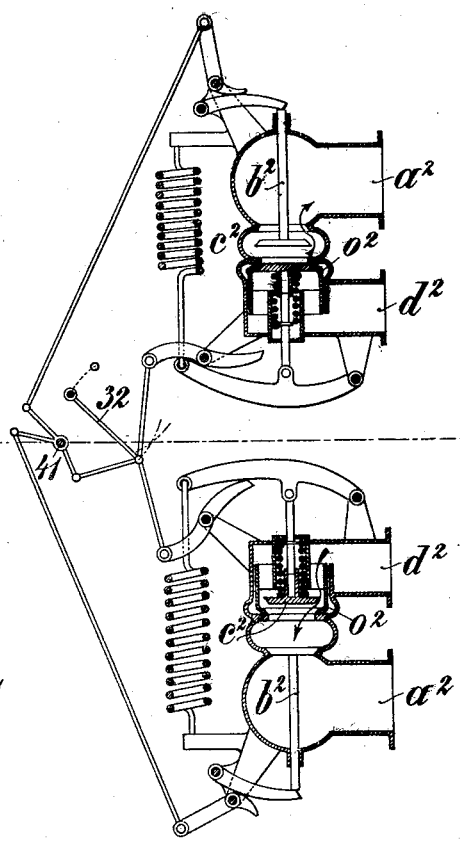
Figure 16:
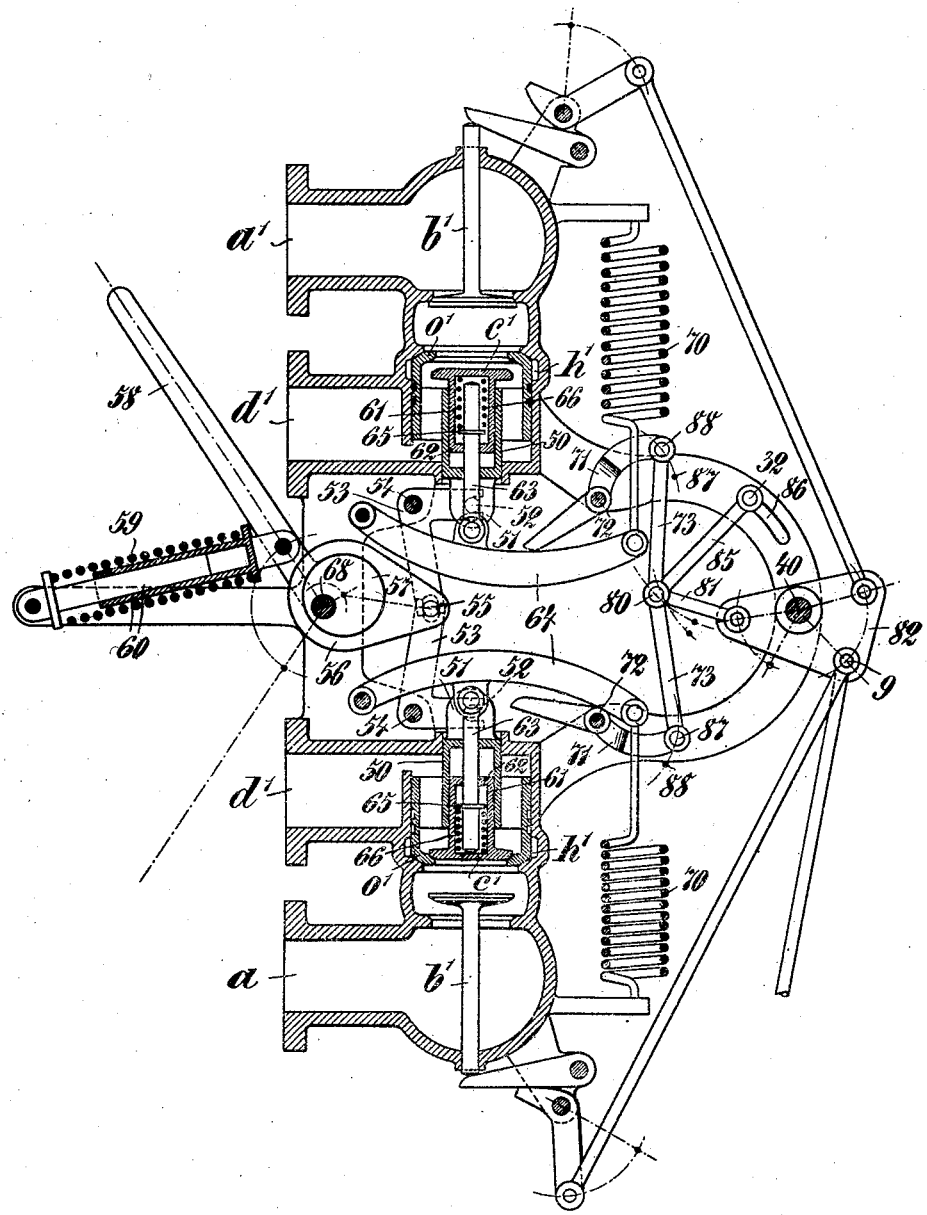
Figure 17:
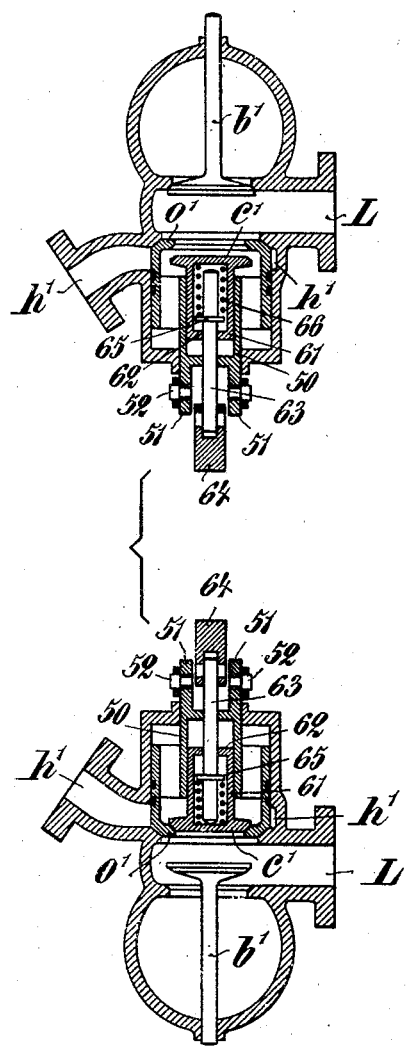
Figure 18:
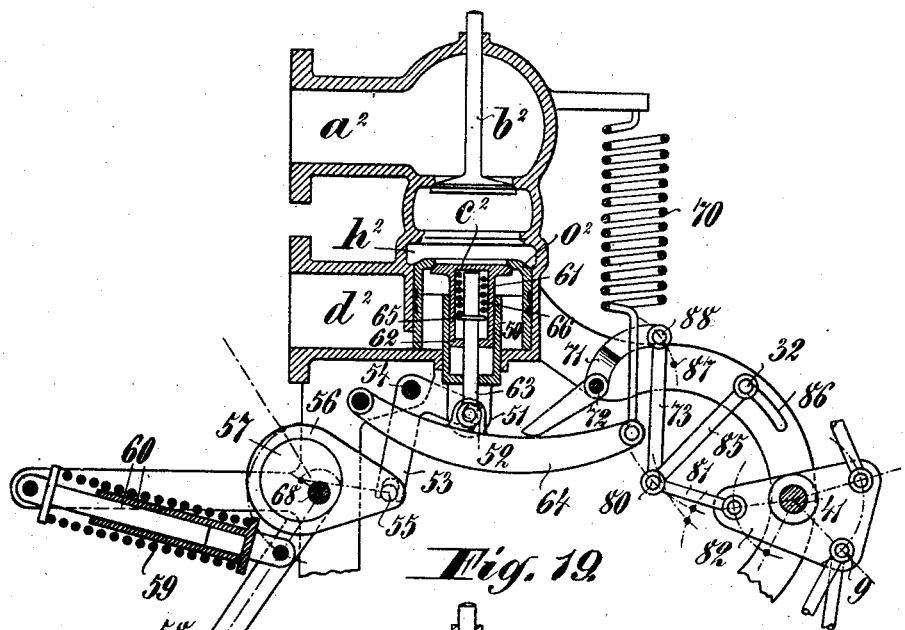
Figure 19:
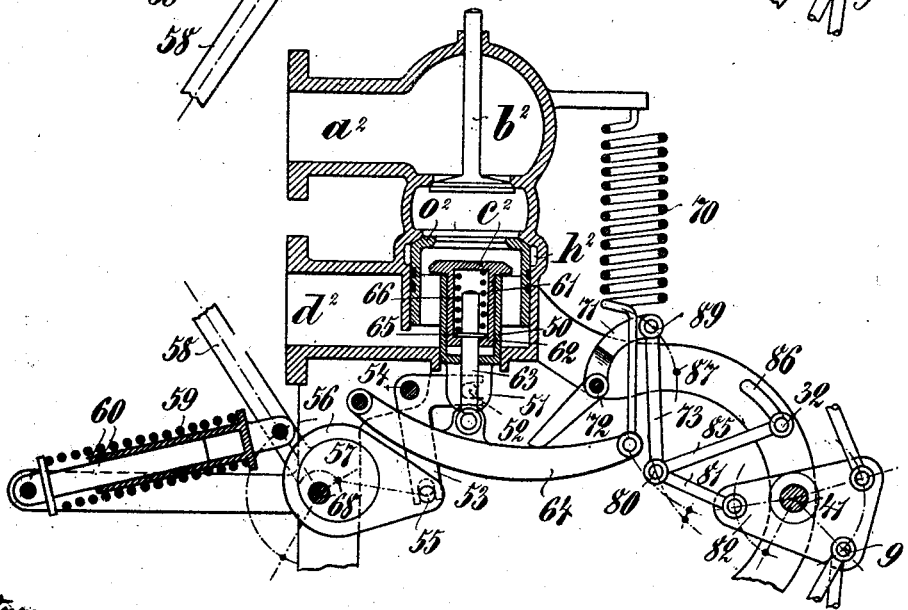

The best form of apparatus at present known to me, embodying my invention together with some modifications of detail construction are illustrated in the accompanying drawings, in which, Figures 1, 2 and 3 show the indicator diagrams of the cycle of operations. Fig. 4 shows the kinematic connection between the travel of the pistons and the valve diagrams. Fig. 5 is a central section through cylinders and valves of one form of engine, the piston rods being broken away. Fig. 6 is a side elevation and partial section of the apparatus shown in Fig. 5, with the cranks and valve gear shown in diagram only. Fig. 7 is a longitudinal section of a form of governing carbureter, which can be advantageously used with my improved motor when a liquid combustible is employed, showing the parts in position for charging the carbureter. Fig. 7ª is a similar section of the same with parts broken away showing the parts in position for discharging the carbureter during the combustion stroke. Fig. 7ᵇ is a cross section on line A—B of Fig. 7. Figs. 8, 8ª, and 8ᵇ are similar views of a modified form of carbureter for use when gaseous fuel is employed, Fig. 8ᵇ being a cross section on line C—D of Fig. 8. Fig. 9 is a front elevation and partial section of a slightly modified form of the engine shown in Figs. 5 and 6, the combustion cylinder being divided into two single acting opposed cylinders with a common, double ended trunk piston, having a double connecting rod and crank. Fig. 10 is an enlarged diagram of the valve motion showing the position when the engine is running in one direction. Fig. 11 is a similar diagram showing the parts in position when starting the engine in the same direction. Fig. 12 is a view in section of the valves of the air cylinder when the engine is running normally and air is being sucked in to the upper end of the air cylinder and forced out of the lower end of the air cylinder into the lower end of the combustion cylinder. Fig. 13 is a similar view of the valves of the expansion cylinder, the exhaust being open from the upper end of the expansion cylinder and the intake from the bottom end of the expansion cylinder being connected with the lower end of the combustion cylinder. Fig. 14 shows the position of the valves on the air cylinder at one period during starting of the engine with compressed air. Fig. 15 is a similar view showing a simultaneous position of the valves on the expansion cylinder when starting the engine with compressed air. Fig. 16 is a longitudinal section on an enlarged scale through the valves of the air cylinder and shows the means for changing the position of the reversing valves, the valve gear being in position for normal running of the engine. Fig. 17 is a longitudinal section through the valves of Fig. 16 in a plane turned to an angle of 90° relatively to the plane of section of Fig. 16. Fig. 18 is a longitudinal section similar to Fig. 16 through the upper group of valves of the expansion cylinder, showing the reversing valves in a different position and Fig. 19 is a longitudinal section similar to Fig. 16 through the upper group of the valves of the expansion cylinder with the valve gear in the position for the starting of the engine.

Throughout the drawings like reference characters indicate like parts.

As illustrated, V is the combustion or high pressure cylinder, E is the expansion or low pressure cylinder, and L the air cylinder or air pump which forces the air for scavenging and forming the combustible mixture into the combustion cylinder V. The piston displacement of the air cylinder and that of the expansion cylinder are each larger than that of the combustion cylinder. In the standard type of engine they are from 4 to 6 times larger. The crank E' to which the piston E² of the expansion cylinder E is connected is retarded behind the crank V' of the combustion cylinder by an angle $v$—$g$ (see Fig. 6) of from 120 to 145 degrees, the cranks rotating in the direction of arrow $v$—$g$, Fig. 6. The crank L' is advanced by an equal angle of lead $r$—$g$. In the engine illustrated these angles are of 135 degrees in each case. This symmetrical arrangement of the cranks renders the expansion cylinder convertible into the air cylinder and vice versa, and so makes the engine easily reversible.

The cycle of operations of the engine is as follows: The air is first compressed in L up to about the amount of the scavenging pressure $p_1$, as is indicated by the diagram in Fig. 1 which is similar to the ordinary compressor diagram. As is seen in Fig. 5 (lefthand side) and Fig. 6, the air is being sucked from the pipe $a_1$ through the suction valve $b_1$ into the lower end of cylinder L, and the compressed air is being pressed from the upper end of cylinder L through the pressure valve $c_1$ into the air-chamber $d$. The air passes from this chamber through the scavenging valves $e$, $e$, into the combustion cylinder V, presses the products of combustion created during the first part of the down stroke, out from the cylinder V through ports $f$ and pipe $h^2$ to the expansion cylinder E and thus sweeps out the combustion cylinder V. As is seen from Fig. 4, the scavenging is effected by the simultaneous suction of the gases by the piston E² and by the ejection of the air by the piston L² of L, which results from the above mentioned position of the cranks. The velocities of the gas and air result from and are limited by the relative changes of position of pistons in cylinders L and E, and a certain positive scavenging is thereby attained.

The thoroughness of the scavenging is promoted by the shape of the admission passages in the cylinder head of V, which is shown in Fig. 5. The scavenging valves $e$, $e$, open into an annular chamber which is connected with the interior of the cylinder through an annular flaring scavenging slot. The velocity of the admission of the air is thereby diminished to from 15 to 20 meters per second and a uniform advance of the air into the cylinder V is effected in the shape of a solid column of air practically free from eddy currents. On the diagram of the combustion cylinder in Fig. 1, the scavenging period is represented by the line 1—2. The reduction of pressure from $p_4$ to $p_1$ is brought about by combined movements of all the pistons, the piston in E, approaching mid stroke moves down more rapidly than the piston in L, approaching the end of its stroke, moves upward. After the piston V² of the combustion cylinder V has covered the exhaust openings $f$, $f$, in its backward stroke, compression follows in the combustion cylinder V up to the highest pressure of the cycle of operations (from 45 to 70 atmospheres) which assures the automatic ignition of the combustion mixture. This operation is represented in Fig. 1 by the curve 2—3. The clearance space in cylinder V being small, the greater part of the air therein is pressed into the governing carbureter, the construction and operation of which is described further hereinafter. The line 3—4 in Fig. 1 shows the pressure curve during this period. During the forward stroke of the piston V², which then follows, the air which is in the clearance space of V expands, in the first place, which is represented by the line 4—5, whereupon, in consequence of the difference in pressure arising between the air in the interior of the governing carbureter and that in the combustion cylinder V, the combustible mixture which is formed in the governing carbureter begins to flow over to V. The ignition of the combustible mixture takes place as it is formed by reason of the heat of the compressed air and the combustion in V proceeds at a definite, practically invariable combustion pressure $p$ which can be regulated. The pressure existing during this operation is represented in Fig. 1 by the curve 5—6. After the generation and outflow of the combustible mixture is finished, and the governing carbureter is practically emptied into the combustion cylinder V, the expansion of the burned gases and of the gases which are still burning, takes place. The pressure curve during this operation is represented in Fig. 1 by the line 6—7. The piston V² of the combustion cylinder V then opens the emission ports $f$, $f$, when the crank E' has reached an angle of from 3° to 8° before the dead point of the piston of the expansion cylinder E, and the gases flow from V through the circular emission conduit and the pipe $h_2$ (Fig. 5 right hand) into the clearance space of E. The pressure in V sinks from $p_3$ to $p_4$ from combined effects of the clearance space of the expansion cylinder E filling up, of the cooling of the gases which takes place while they are flowing, and of the expansion of the gases brought about by the relative movements of all the pistons. This operation is represented in Fig. 1 by the curve 7—1, and on the diagram of the expansion cylinder E in Fig. 2, by the curve 8—9. The remaining burned gases in cylinder V are pressed from V to E by the scavenging action which takes place again as already described. The curve 9—10 in Fig. 2 represents this operation. After the expansion cylinder crank E' has traveled a certain angle and the piston $E^2$ is well started on its downward stroke, the combustion cylinder piston again closes the emission ports and the expansion of the gases in the expansion cylinder E follows, as the curve 10—11 indicates. When the piston $E^2$ approaches the lower end of the stroke, the emission valve $b_2$ of the expansion cylinder E opens, and the waste gases are driven out through the pipe $a_2$ into the open air by the upstroke of piston $E^2$ until this valve again closes and the remaining gases are compressed. These two operations are represented by the curves 11—12 and 12—8 in Fig. 2. The cycle of operations is thus completed.

In the described cycle of operations the scavenging pressure $p_1$ results from the pressure at the end of the admission period into the expansion cylinder E and is directly controlled by the relative volumes of combustion cylinder V, and cylinders E and L, and varies with the engine load, and is in inverse proportion to the angle through which the cranks travel while ports $f, f$, are open. The compression pressure in the combustion cylinder V and the combustion pressure $p_2$ are determined by the capacity and operation of the governing carbureter. They remain unchanged with varying load and are only dependent on the pressure in a special pressure regulator W (see Fig. 6).

In Figs. 7 to $8^b$ illustrating the construction of the governing carbureter, V represents a portion of the wall of the combustion cylinder of the engine, r is the casing or outer shell of the governing carbureter which forms the air cylinder of said carbureter. It has a nozzle 100 which extends through an opening in the cylinder wall V, into the combustion cylinder. A pipe $t$, connects to the upper portion of the carbureter casing $r$, and connects the air cylinder, formed in said casing, with a pressure regulating chamber indicated at W (a portion being broken away in the drawing). $p$ is an air piston located in the air cylinder formed by the casing $r$ and mounted on a hollow spindle or sleeve 101 which surrounds the spindle $s$ of the air valve $l$. The seat for this air valve $l$ is formed in the interior of the nozzle 100, and has a radial groove 102 to equalize the pressures existing under the air piston $p$ and in the combustion cylinder. The spindle $s$ of the air valve is also hollow and contains a hollow revolving oil feed controlling spindle $n$, and in this hollow spindle $n$ is a tightly fitting plunger $i$ secured to a cross pin $u$ which passes through slots 103 formed in the spindles $s$, and $n$, and is fixed in the sleeve 101 of the piston $p$ (see Fig. $7^b$).

The upper end of spindle $n$ has a laterally projecting lug or ear $z$ which projects through an opening in the hollow spindle $s$ and is connected to a rod $y$ or other mechanism for turning the said spindle $n$ about its axis through a certain angle. The lower end of spindle $n$ is provided with two openings 104 (see Fig. $7^a$) and 105 (see Fig. 7). When spindle $n$ is in one position shown in Fig. $7^a$, the opening 104 communicates with a number of fine passageways 106 through the face of the air valve $l$. When the spindle $n$ is in another position shown in Fig. 7, the opening 105 communicates with a channel $k$ running lengthwise of the spindle $s$ and extending to a nipple $j$ in the upper end of the spindle to which any convenient source of oil (not shown) may be connected.

117 is a lever arm pressing on the head of spindle $s$ and pivoted at 118 to the standard 119 formed on the casing of the carbureter.

107 is a flange on spindle $s$ which limits its upward motion by striking against the carbureter casing.

The operation of the above described apparatus is as follows: The parts are in the position shown in Fig. 7, while compression is being produced in the combustion cylinder V. A portion of the compressed air in the cylinder passing through slot 102, when the pressure is sufficient to overpower that produced on top of piston $p$ by the air in pressure regulator W, lifts piston $p$ gradually. This raises spindle $s$ through frictional engagement of hollow spindle 101 until shoulder 107 strikes the casing of the carbureter and checks further movement of the spindle $s$. Further movement of piston $p$ moves plunger $i$ upward relatively to hollow plunger $n$ in which it is mounted (the operative connection being formed by cross pin $u$) and plunger $i$ acts as a piston to suck in a supply of oil through $j, k$, and 105 to the interior of hollow spindle $n$. Fig. $7^a$ shows the partly raised position of piston $p$ and plunger $i$. When the piston in the combustion chamber reverses its motion and the compression diminishes the pressure above the piston $p$ predominates and the piston $p$ begins to descend tending to close the air valve $l$, but the closure of the valve is resisted by the pressure of the air being forced under it from the carbureter air cylinder $r$ back to the combustion cylinder. At the moment of this reversal the spindle $n$ is partially rotated by any convenient governing mechanism connected to rod $y$, such as bell crank 202, link 201, and connections shown in Figs. 10 and 11, so that the oil inlet to the interior of the spindle $n$ is closed and the discharge opening 104 connects with the fine perforations 106 through the face of the air valve $l$. This shifting of spindle $n$ is possible because of the width of slots 103 (see Fig. 7$^b$) which permits a rotation of several degrees before the cross pin $u$ checks further movement.

The descent of the plunger $i$ forces jets of oil through perforations 106 into the path of the current of air driven out by descending piston $p$ and a combustible mixture of vaporized oil and air is thus formed and forced into the combustion cylinder. The rate of flow of the air can be positively controlled by positively controlling the area of the air valve opening, through pressure of lever 117 on spindle $s$, and the proportions of oil to air thus rendered constant.

A modified form of governing carbureter designed for gas engines is shown in Figs. 8, 8$^a$ and 8$^b$. The somewhat modified construction is due to the large dimensions of the gas cylinder as compared with the very small oil cylinder in the spindle $n$ in Fig. 7. The upper end of the air cylinder $r$ of the carbureter is connected with the pressure regulating chamber W by the short pipe $t$, and the lower end is connected by the nozzle 100 to the combustion cylinder V. The hollow air piston $p$ forms a gas cylinder 110, the lower part of which constantly communicates with a high pressure gas container (not shown) by the channel $k^1$, the hollow sleeve $u^1$ and the pipe $j^1$. The piston $p^1$, connected with the sleeve $u^1$ separates the upper parts of the movable gas cylinder 110 from the lower part. A hollow gas spindle $g$ adapted to turn and serve as gas distributer is inclosed in the spindle $s$. The spindle $g$ is in constant communication with the upper part of the gas cylinder 110 by lateral openings 111. When the spindle $g$ is by means of the governor rod $y$ turned into the closed position the inside of the spindle communicates by openings 112 with the lower part of the gas cylinder 110 (Fig. 8). In the open position the openings 112 are closed, and the openings 113 of the spindle $g$ are in communication with the mixing perforations 114 of the air valve (Fig. 8$^a$).

The operation is as follows: At the up stroke of the piston $p$ gas is forced from the chamber 110 into the chamber N above the piston $p^1$, the channels 112 being open by reason of the spindle $g$ being in the position of Fig. 8. On the down stroke of the piston $p$ the channels 112 are closed by the spindle $g$ being turned into the position shown in Fig. 8$^a$, and the gas will be forced from the chamber N above the piston $p^1$ through the hollow spindle $g$ into the combustion cylinder V, and at the same time gas will be drawn from the gas container through the channel $k^1$ into the chamber 110.

In the oil carbureter shown in Fig. 7, the air piston $p$ and the oil plunger $i$, being rigidly connected, form a compound piston. In the same way in the gas carbureter shown in Fig. 8, the piston $p$ has an upper portion which operates on the gas in cylinder N and a lower portion which operates upon the air in M and forms a similar compound piston. In both cases this compound piston operates to force the air and combustible in measured quantities to the point of mixture and thence into the combustion cylinder.

Figs. 16, 17, 18 and 19 show the construction of the reversing valves $o^1$, $o^2$, and the device for shifting them, Figs. 16$^°$ and 17 showing the position of the valves $o^1$ of the air cylinder L, and Figs. 18 and 19 that of one valve $o^2$ for cylinder E.

As in Fig. 5, $a^1$, $a^1$, are the inlet branches from the outer air, $b^1$, $b^1$, air inlet valves, $c^1$, $c^1$, outlet valves for the air compressed in the air cylinder, $d^1$, $d^1$, branches connecting with the air inlet chamber $d$ for the scavenging air to be delivered to the combustion cylinder (Figs. 6 and 9), $h^1$, $h^1$, the branches connecting with the combustion cylinder V through ports $f$, $f$, and $o^1$, $o^1$, the reversing valves. The latter are cylinder valves which when the corresponding cylinder acts as an air cylinder, must always keep the connecting branches $h^1$, $h^1$, closed, that is to say, be in the position shown in Figs. 5, 12, 14, 16, 17, and 19. To this end, their hollow stems 50 have each two lugs 51 connected by pins 52, which pins engage bell crank levers 53 (Figs. 18 and 19) which are pivoted to pins 54 secured to the frame of the engine. The bell crank levers 53 of the two valves $o^1$, $o^1$, both engage with their free ends with a pin 55 on an eccentric strap 56 mounted on an eccentric 57. The eccentric 57 can be oscillated by means of a hand lever 58 being mounted on a short shaft 68 journaled in the engine frame. A spring 59 mounted on a telescoping member 60 holds the lever 58 in either of the positions given to it, shown in Figs. 18 and 19. The valves $c^1$, $c^1$, have hollow stems 61, 61, which slide in the hollow stems 50 of valves $o^1$, $o^1$, and which have inwardly projecting end lips 62 which guide plunger rods 63 connected to the valve levers 64. The rods 63 are each provided with a collar 65. Between the said collar and the disk of each of the valves $c^1$, $c^1$, is arranged a weak spring 66 secured at one end to the valve $c^1$ and at the other to the said collar 65 of the rod 63. Springs 70, 70, are so connected with the valve gear levers 64, 64, as to tend to close the valves $c^1$, $c^1$, by forcing them to their seats formed in the valves $o^1$, $o^1$. To permit the opening of said valves $c^1$, $c^1$, the lever 64 of each valve must first be forced away by the valve gear against the action of its spring 70. This is effected by means of a lever 71 oscillated about a fixed pin 72 by means of a rod 73. The connecting rods 73, 73, from the levers 71, 71, of the two valves $c^1$, $c^1$, are hinged to a pin 80 which is connected by a connecting rod 81 to an oscillating member 82, pivoted on a fixed journal pin 40 (see also Figs. 10, 11, 14 and 16). To this member 82 the valve gear connecting rod 9—2 is attached by a pin 9, (Fig. 10) so as to oscillate the said swinging member 82 when the engine is in operation. A radius rod 85 guides the pin 80, the said radius rod being pivoted on a pin 32 which is adjustably held in a slot 86 formed in the rigid sector 90. If the pin 32 is in its upper end position (Figs. 12, 16 and 18) the ends of the connecting rods 73, 73, which are pivoted to the levers 71, 71, move along dotted arcs 87—88 (Fig. 16) when the swinging member 82 oscillates about its pivot pin 40. If the pin connecting either of the levers 71, 71, with its connecting rod 73 be at the point 87, the corresponding valve $c^1$ is held closed by spring 70, as shown in the bottom portion of Fig. 16, but if the said pin is at a point 88, then the corresponding lever 71 is pressing back its lever 64, and the corresponding valve $c^1$ is relieved from the pressure of the spring 70, and may open automatically whenever there is excess of pressure in the air cylinder L, all as shown in the upper portion of Fig. 16. The air compressed in the air cylinder can then pass through $d^1$ and into $d$ and to the combustion cylinder V. On the reverse stroke of the engine this same upper valve $c^1$ will be closed by spring 70, the upper lever 71 disengaging its companion lever 64 and assuming the position corresponding to that shown in the lower part of Fig. 16. During this reverse stroke, of course, the bottom valve $c^1$ is in its turn released from the pressure of its spring 70 and may open automatically at the proper time by compressing its spring 66.

The valves $o^1$, $o^1$, on the cylinder used as an air cylinder always remain in the position shown in the left hand side of Fig. 5, and in Figs. 12, 16 and 17, but when the engine is reversed and the cylinder to which these valves are connected becomes the expansion cylinder these valves are moved to the position shown on the right hand side of Fig. 5, and Figs. 13, and 18.

In starting the engine the pin 32 is shifted into its other end position in slot 86 shown in Figs. 14, 15, and 19, so that the points of pivotal connection between levers 71 and connecting rods 73 move along the dotted arcs 87—89 (Fig. 19) instead of along the dotted arcs 87—88. Consequently the levers 64, 64, are moved by the levers 71, 71, through larger angles and to an extent such that the collars 65, 65, on the rods 63, 63, strike the lips 62, 62, on the hollow valve stem 61, 61, and positively move the corresponding valves $c^1$, $c^1$, from their seats. This is necessary in starting the engine as these valves must then be positively opened against the pressure of compressed air coming through $b^1$, $b^1$, from the air reservoir to be admitted to both the air cylinder and the expansion cylinder.

Fig. 18 shows the position of the reversing valves $o^2$, $o^2$, in the expansion cylinder E. Only the upper group of valves is shown as those in the bottom half have the same relative position, as indicated in Fig. 16. As will be seen, the hand lever 58 has here been moved in Fig. 18, so that the eccentric 57 has turned, and thus the eccentric strap 56 and the pin 55 have been moved to such an extent that the bell crank lever 53 has pulled down the pin 52, and the valve stem 50 so as to move the reversing valve $o^2$, away from its seat, and close the branch connection $d^2$. The interior of the expansion cylinder E is now connected to the branch $h^2$ leading to the combustion cylinder V (see Fig. 5). The opening and the closing of the valves $c^2$, $c^2$, is effected in the same manner (when the engine is reversed or is starting into action), as previously described with reference to the valves $c^1$, $c^1$, in the air cylinder L.

In starting, the expansion cylinder E must work exactly like the air cylinder L, consequently in starting the hand lever 58 is moved into the position shown in Fig. 19, and the pin 32 is moved in the slot 86 from the position shown in Fig. 18 into the position shown in Fig. 19, so that the hinge pin of the lever 71 and connecting rod 73 does not move along the short arc 87 to 88, but along the longer arc 87—89, and the valves $c^2$, $c^2$, as already described, are positively opened, the collar 65 striking the lip 62 on each hollow valve stem 61. After the engine has been started, the pins 32 of the two cylinders E and L are again moved back into the position shown in Figs. 16 and 18, and the hand lever 58 of the expansion cylinder E is moved from the position shown in Fig. 19 into the position shown in Fig. 18.

If it is desired to reverse the engine, the hand lever 58 of the air cylinder L is moved from the position shown in Fig. 16, into the position shown in Fig. 18, and that of the expansion cylinder E from the position shown in Fig. 18 into the position shown in Fig. 16. In short, the levers 58, 58, are the reverse levers, the one on the right hand cylinder, looking at Fig. 5, being lowered and that on the left hand cylinder being raised when the engine is arranged as shown in Fig. 5, to run in one direction, and these positions being reversed when it is desired to run the engine in the other direction. This change in position of levers 58, 58, positively shifts the positions of valves $o^1$, $o^1$, $o^2$, $o^2$, through the connecting mechanism shown in Figs. 16, 17, 18 and 19.

The radius rods 85 (one for each of the cylinders L and E) determine by their adjustment whether the valves $c^1$, $c^2$, shall be positively operated so as to start the engine, by rendering each of the cylinders L and E a power cylinder into which compressed air is to be admitted, or whether one set of these valves shall operate automatically as spring outlet valves for its cylinder acting as an air pump (absorbing power), while the other set of these valves, those on the cylinder used as a power cylinder for expanding gases from the combustion cylinder, are held out of action by the valves $o^2$, $o^2$, (Figs. 13 and 18).

When the center of vibration 32 is at the upper end of slot 86, the latter or normal operation of the engine is produced. The valves $c^1$, $c^1$, are then free from positive operation by the valve gear and become merely spring pressed discharge valves for air pump L (normally closed by springs 66) and opening automatically, when excess air pressure exists in the air pump cylinder during compression stroke, to permit the air for scavenging and charging the combustible cylinder V to pass from L through $d^1$, $d$ and $e$ to said combustible cylinder. During the intake stroke of piston $L^1$ the valves $c^1$ automatically close by the action of spring 66, and the intake valves $b^1$, $b^1$ are opened by the lever and cam systems 200, 200, (see Figs. 12, 16 and 17) or by suction, while the valves $b^2$, $b^2$ are positively operated by gear 200 as exhaust valves on expansion cylinder E (see Fig. 13). The valves $o^2$ are positively and continuously held by the reversing mechanism in the position shown in Figs. 5, 13 and 18 so as to close the connection $d^2$, and leave the connection from $h^2$ to the expansion cylinder permanently open. When the center of vibration 32 is at the other end of the slot 86 (see Fig. 19) the movement of levers 71 is amplified so that valves $c^1$ or $c^2$ are positively opened thereby at the proper time against the pressure of air from the reservoir of compressed air and act as positively operated admission valves to permit such air to pass from a reservoir (not shown) through $d^1$ or $d^2$ (Figs. 15 and 19 showing the connection open from $d^2$) to the cylinders L and E in turn, and so render them both power cylinders. Previously the reverse lever 58 on the expansion cylinder must have been shifted from the position shown in Fig. 18 to that shown in Fig. 19, so that both reversing levers 58 will be in raised positions and all valves $o^1$, $o^1$, $o^2$, $o^2$, placed so as to shut off branches $h^1$, $h^1$, $h^2$, $h^2$. Both sets of valves $b^1$, $b^1$, and $b^2$, $b^2$, then become exhaust valves positively operated by gear 200, 200, to exhaust the air from cylinders E and L through $a^1$ and $a^1$. This operation is shown in Fig. 15, where compressed air is being admitted at mid stroke of the piston to the lower end of cylinder E, and exhausted from the upper end. Fig. 14 shows the valves of cylinder L all closed at the moment the movement of the piston $L^2$ is being reversed, at the end of a stroke, the cranks $E^1$ and $L^1$ being placed 90° from each other, in the engine shown. This gives a full starting torque in any position for either direction. During this starting operation the supply of fuel is shut off, so that cylinder V neither develops nor absorbs power. The admission of compressed air is cut off in cylinder L and E at 7/10 of each stroke, with the gear here illustrated.

The kinematic relation between the piston travel and valve diagrams is represented in Fig. 4, where the valve diagrams which indicate the movements of the separate valves are marked with the same reference letters as the valves themselves in Figs 5, 6 and 7. The air or gas admission into the cylinder is marked by hatching A in Fig. 4, its emission by hatching B, and the admission of the combustible by hatching C. For sake of clearness the diagrams are only represented for one side of the cylinder. The above mentioned kinematic diagram is symmetrical, as most of the engine parts have one and the same motion for both directions of rotation. The necessary movements of the distributing mechanisms may be brought about by different kinds of eccentrics or cams or by combinations of the same. Fig. 6 represents in diagram a suitable kind of valve-motion in the form of an eccentric in combination with the usual levers and shifting connecting-links, for the reversal, and starting of the engine and the distributing of the combustible during normal operation. The main eccentric O—1 has the same angular position as the crank $V^1$ for the piston in the combustion cylinder and moves the valves $b^1$, $b^1$ of the air-cylinder L and $b^2$, $b^2$, of the expansion cylinder E, which valves have exactly similar motion during normal operation of the engine, as shown in Figs. 12 and 13, with the angles of lead and lag here assumed. This eccentric also allows valves $c^1$, $c^1$, of the air cylinder L to open and positively closes them through the mechanism before described and positively drives the valves $e$, $e$, of the combustion cylinder V by mechanism hereinafter described. Its action on these valves is indicated at Z, Z, in Fig. 4.

When the valves are in the position for starting the engine the valves $c^2$, $c^2$, of the expansion cylinder are worked from the same eccentric as during normal operation (through gear 1—2—9—41, Figs. 10 and 19) but the valves $c^1$, $c^1$, on the air cylinder must be given a lag of 90° behind those of the air cylinder and this is effected by shifting the link 203, out from its normal position of parallelism to link 204 (as shown in Fig. 10) into the position shown in Fig. 11. This puts it, and the oscillating member pivoted at 40, (Figs. 11 and 16), under control of the link and lever system 7—6—5—4—3—2 which gives a motion having a 90° lag behind valves $c^2$, $c^2$. The link 2—3 is pivoted at 2 to the lever 2—16—17, journaled on the main frame at 16. The link 4—8 has a journal on the main frame at 5.

The rod 10—11, pivoted to the link 2—3 at one end and to the double bell crank 206 pivoted to the main frame at 42, controls the levers 117, 117, which operate the air valves $l$, $l$, by pressing on their stems $s$, $s$. A motion is thus imparted to the valves $l$, $l$, such as would be given by an eccentric which lagged about 20° behind the eccentric 0—1, and corresponding to the curve shown in Fig. 4.

A small bell crank 12—13—14 which is pivoted at 13 on the swinging lever 2—16 and connected at 12 by a sliding joint with link 2—3 controls the distribution of the fuel through link 14—15 which is adjustable on arm 13—14, by means of an ordinary centrifugal governor or other automatic governing device (not shown) connected at 19. The upper end 15 of the link 14—15 is pivoted to a radius link 15—31, journaled on a fixed pivot at 31. The motion of point 15 is transmitted through link 201 and bell crank 202 to rod $y$ which controls the fuel feed spindle $n$ (Figs. 7 and 7a). The quantity of fuel fed to each charge of the governing carbureter is thereby regulated according to the load on the engine.

To reverse the engine the reverse levers 58, 58, are shifted as before described to change the position of valves $o^1$, $o^1$, $o^2$, $o^2$, and the link 44 (Fig. 10) is shifted from the position 3—4 to 3—8. This last position is also indicated in dotted lines in Fig. 6.

The valves $e$, $e$, for admitting air for scavenging and charging the combustion cylinder V are positively driven by links 35, levers 36 (Fig. 10) slide rod 37, link 34, lever 18 and connecting rod 205 which latter is pivoted at 17 to lever 2—16—17.

The entire valve mechanism above described and driven from one eccentric might be cut up into separate mechanism driven from different eccentrics.

The efficiency of the present motor is but very little dependent on the load on the engine. The actual consumption of air of the oil motor may be about 1.8 times the theoretical air consumption at a standard load. The piston displacement of the expansion cylinder or the air cylinder per second is about 1.6 liters per indicated H. P. at normal load. Thanks to the compound arrangement, the greatest excess pressure above that of the atmosphere in the expansion cylinder of the present engine does not exceed 11 atmospheres. Hence the high specific efficiency of the engine results, it being founded on the peculiar combination of the two-cycle type with compound arrangement of double acting cylinders.

The ignition and combustion of the fuel is determined and regulated by the governing carbureter shown at $r$, $r$, Fig. 6.

It is evident on analysis of the foregoing description and drawings that the mechanism described is a prime mover which may be operated either as a double acting compound internal combustion motor of the two cycle type, V and E being the high and low pressure cylinders respectively, or as a two cylinder double acting fluid pressure motor with cranks spaced a quarter of a cycle apart, the cylinders L and E then becoming the motor cylinders and the combustion cylinder V being cut out of operation.

The carbureter illustrated is in substance a carbureter having an expansible chamber which can be expanded by the pressure of air forced into it from the combustion cylinder during the compression period therein so as to receive practically all of the air in the combustion cylinder and then forcibly contracted to expel said air, with admixed combustible, during the power generating stroke of the piston in said combustion cylinder. As shown, the means for contracting the capacity of such chamber is the piston $p$ and pressure of air from reservoir W on the other side thereof, but other forms of expansible chamber might be substituted for this construction and other means for generating the contracting pressure substituted for the compressed air from reservoir W.

Having, therefore, described my invention, I claim:—

1. An internal combustion motor comprising in combination a combustion cylinder, an air cylinder, an expansion cylinder, pistons, connecting rods therefor and a common crank shaft, the crank for the piston of the air cylinder being displaced forward by an angle from 145 to 120 degrees relative to the crank of the piston of the combustion cylinder, and the crank of the piston of the expansion cylinder being displaced rearward by the same angle relative to the said crank of the combustion cylinder, together with valves located between the cylinders and adapted to control communication between the air cylinder and the combustion cylinder and the expansion cylinder and the combustion cylinder.

2. An internal combustion motor comprising in combination a high pressure combustion cylinder, an air pump, a low pressure expansion cylinder, pistons, connecting rods and cranks therefor, so connected together that the pump piston moves ahead of the combustion cylinder piston and the expansion cylinder piston moves behind it at equal angles of lead and retard, together with suitable passageways from pump to combustion cylinder and from combustion cylinder to expansion cylinder.

3. An internal combustion motor comprising in combination a high pressure combustion cylinder, an air pump, a low pressure expansion cylinder, pistons, connecting rods and cranks therefor, so connected together that the pump piston moves ahead of the high pressure piston at a distance corresponding to an angle of 135 degrees crank lead, and the low pressure piston moves behind the high pressure piston at an equal angle of lag, together with suitable valve controlled passageways connecting the cylinders.

4. In an internal combustion motor the combination of a combustion cylinder, two additional cylinders, pistons, connecting rods and cranks therefor with a common crank shaft, the cranks of the two additional cylinders being spaced at equal angles from and upon opposite sides of that of the crank of the combustion cylinder, together with connections from ports in the additional cylinders to the ports in the combustion cylinder and two sets of valves controlling said respective connections, said valves being disposed symmetrically with reference to the ports of the combustion cylinder.

5. A prime mover comprising in combination an internal combustion motor, of the two cycle type, and two additional cylinders with pistons therein, each provided with connections to the inlet and outlet ports of the two cycle cylinder, and a valve mechanism controlling said connections by which when either one additional cylinder is connected to the inlet ports of the two cycle cylinder, the other is connected to the exhaust ports thereof, together with means for causing the pistons in all said cylinders to reciprocate in predetermined relation each to the others.

6. In an internal combustion motor comprising the combination of a high pressure combustion cylinder and piston, an air pump, a low pressure cylinder and piston, a common crank shaft to which the pistons of all three are connected, and an adjustable valve gear by which the air pump and low pressure cylinder may be transformed into a two cylinder fluid pressure motor and the combustion cylinder cut out of operation.

7. In an internal combustion motor the combination of a combustion cylinder, piston, connected crank and crank shaft thereon, a single eccentric on said shaft, inlet and outlet valves for the cylinder, a carbureter connected to the cylinder, an oil valve and an air valve in said carbureter and mechanism by which all said valves are controlled from the single eccentric.

8. An internal combustion motor comprising in combination a combustion cylinder, and two additional cylinders connected thereto, valves controlling said connections and valves controlling the connection from each of said additional cylinders to the external air, duplicate valve operating mechanisms, one for each of said additional cylinders, and means for giving said duplicate mechanisms motions exactly similar one to the other and simultaneous one with the other during normal operation of the motor.

9. In an internal combustion motor comprising in combination a combustion cylinder, piston and crank therefor, two additional cylinders connected to the combustion cylinder, pistons and cranks therefor, and a common crank shaft, the cranks of the additional cylinders being set 90 degrees apart, valves controlling the connections from the additional cylinders to the combustion cylinder and to the external air, duplicate valve operating mechanisms, one for each of said additional cylinders, and means for giving said duplicate mechanisms motions exactly similar one to the other, and either simultaneous one with the other, or separated by a period equal to one quarter of a cycle of the motor.

In testimony whereof I have hereunto set my hand in presence of two subscribing witnesses.

WASSILY GRINEWEZKI.

Witnesses:
　GUSTAVE SCARTIND,
　ERNST GOCIFE.